(12) United States Patent
Miyaji et al.

(10) Patent No.: US 8,226,480 B2
(45) Date of Patent: Jul. 24, 2012

(54) GAME APPARATUS, COMPUTER-READABLE RECORDING MEDIUM RECORDED WITH A PROGRAM FOR GAME APPARATUS, AND METHOD OF CONTROLLING IMAGE OBJECT

(75) Inventors: Kenichi Miyaji, Tokyo (JP); Hiromitsu Kanegae, Tokyo (JP); Tetsuhiro Honjo, Tokyo (JP); Akifumi Ishizuka, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 114 days.

(21) Appl. No.: 12/751,441

(22) Filed: Mar. 31, 2010

(65) Prior Publication Data

US 2010/0248838 A1    Sep. 30, 2010

(30) Foreign Application Priority Data

Mar. 31, 2009 (JP) ................................. 2009-088057
Mar. 15, 2010 (JP) ................................. 2010-058097

(51) Int. Cl.
*A63F 9/24* (2006.01)
*A63F 13/00* (2006.01)
*G06F 17/00* (2006.01)
*G06F 19/00* (2011.01)

(52) U.S. Cl. ................................. 463/36; 463/37; 463/38

(58) Field of Classification Search ............. 463/36–39; 345/159, 162
See application file for complete search history.

(56) References Cited

U.S. PATENT DOCUMENTS

| | | | | |
|---|---|---|---|---|
| 2004/0029640 | A1* | 2/2004 | Masuyama et al. | 463/43 |
| 2007/0265085 | A1* | 11/2007 | Miyamoto et al. | 463/37 |
| 2007/0270222 | A1* | 11/2007 | Yamanaka et al. | 463/37 |
| 2007/0270223 | A1* | 11/2007 | Nonaka et al. | 463/37 |
| 2008/0024435 | A1* | 1/2008 | Dohta | 345/156 |
| 2008/0064498 | A1* | 3/2008 | Okamura | 463/34 |
| 2008/0076566 | A1* | 3/2008 | Miyamoto | 463/37 |
| 2008/0076567 | A1* | 3/2008 | Dohta | 463/37 |
| 2008/0132339 | A1* | 6/2008 | Taira | 463/43 |
| 2008/0177497 | A1* | 7/2008 | Ohta | 702/141 |
| 2008/0261692 | A1* | 10/2008 | Endo | 463/31 |
| 2008/0274813 | A1 | 11/2008 | Sato | |
| 2010/0248833 | A1* | 9/2010 | Okamura | 463/36 |

FOREIGN PATENT DOCUMENTS

JP    2002153673 A   *  5/2002

\* cited by examiner

*Primary Examiner* — Milap Shah
(74) *Attorney, Agent, or Firm* — Rankin, Hill & Clark LLP

(57) ABSTRACT

A game apparatus includes a main apparatus, an image display apparatus including a display screen, a controller including an acceleration sensor, and a game executing section. The game executing section determines whether or not an acceleration signal generated is normal, based on a first half wave signal of the acceleration signal occurring in an axial direction when the controller is moved. The game executing section moves an image object based on a second half wave signal occurring subsequent to the first half wave signal and having a reversed polarity. The game executing section executes display control to move the image object back to a home position upon detecting that the second half wave signal reaches a peak. Thus, displaying the image object may be controlled according to the movement of the controller. The display control may be executed based on a normal acceleration signal without performing complicated steps.

11 Claims, 17 Drawing Sheets

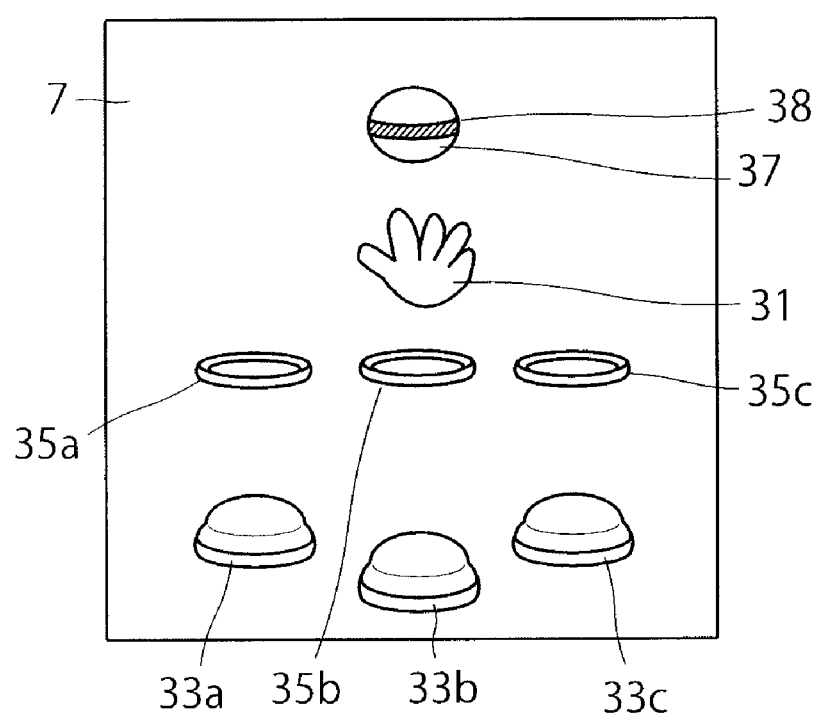

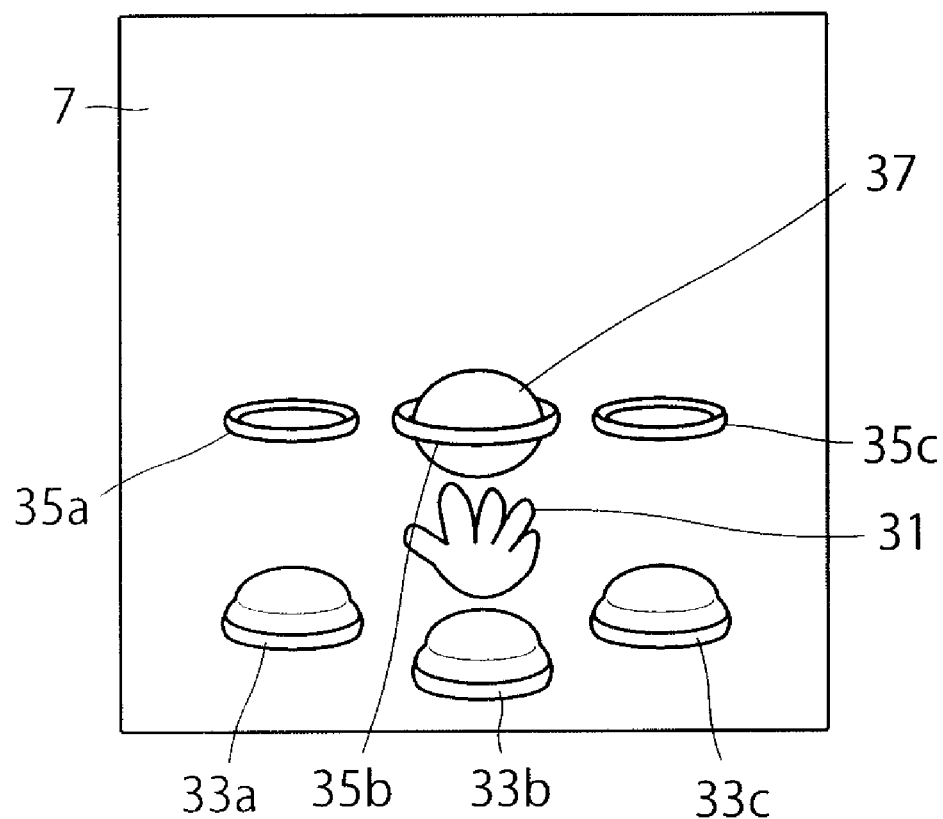

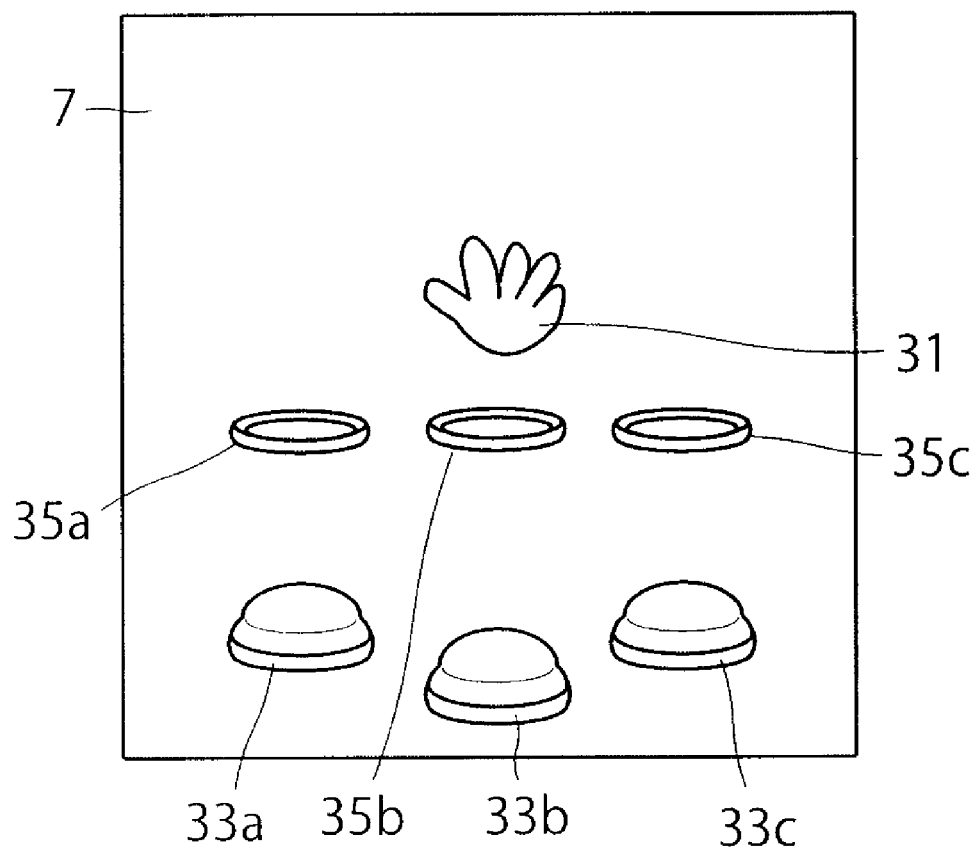

GAME APPARATUS, COMPUTER-READABLE RECORDING MEDIUM RECORDED WITH A PROGRAM FOR GAME APPARATUS, AND METHOD OF CONTROLLING IMAGE OBJECT

TECHNICAL FIELD

The present invention relates to a game apparatus in which the movement of a controller including an acceleration sensor that is operated by a game player is reflected in the movement of an image object displayed on a display screen, a computer-readable recording medium recorded with a computer program for the game apparatus, and a method of controlling the image object.

BACKGROUND ART

A technique has been known to reflect the movement of a controller including an acceleration sensor that is operated by a game player on the movement of an image object displayed on a display screen in real time.

For example, Japanese Patent Application Publication No. 2008-276615 (JP2008-276615A) discloses an invention in which an output from an acceleration sensor is used and reflected as it is on the movement of an image object.

This invention as disclosed in JP2008-276615A is directed to a situation in which an acceleration sensor is used to output an acceleration signal as shown in FIG. 20 of the disclosure when a controller including an acceleration sensor is swung. In this invention, a moving direction of the controller is computed based on an acceleration signal outputted at the time of deceleration among acceleration signals outputted from the controller and image processing is performed based on the computed direction.

SUMMARY OF INVENTION

Normal acceleration signals are not always outputted when the controller including the acceleration sensor is moved. In some cases, acceleration signals inappropriate for display control of the image object may be outputted depending on how the controller is moved. Here, an inappropriate acceleration signal means a signal that does not appropriately indicate a movement of the controller or a signal that includes an unexpectedly generated noise.

If image processing is started using an acceleration signal at the time of deceleration as with the invention as disclosed in JP2008-276615A, the timing to process the movement of an image object may be delayed so that the game player may feel strange about the movement of the image object. To control the movement of the image object so that the game player may not feel strange about the movement of the image object, complicated processing is required.

An object of the present invention is to provide a game apparatus capable of controlling the movement of an image object based on an acceleration signal by excluding signals that are inappropriate for controlling the image object among those signals outputted from an acceleration sensor, a computer-readable recording medium recorded with a computer program for the game apparatus, and a method of controlling the image object.

Another object of the present invention is to provide a game apparatus capable of allowing the actual movement of a controller to be substantially consistent with the movement of an image object so that a game player may feel comfortable, without performing complicated processing, a computer-readable recording medium recorded with a computer program for the game apparatus, and a method of controlling the image object.

A game apparatus according to a first embodiment of the present invention basically comprises a controller that includes an acceleration sensor for detecting one or more accelerations in one or more axial directions and outputs a plurality of operation signals including one or more acceleration signals outputted from the acceleration sensor with respect to the one or more axial directions, an image display apparatus including a display screen, and a game executing section. The game executing section includes at least functions of executing a game program by using the plurality of operation signals as input signals, displaying an image object on the display screen of the image display apparatus based on the result of execution, and controlling a movement of the image object relative to a home position predetermined on the display screen as a starting point of the movement of the image object according to an output from the acceleration sensor for detecting the one or more accelerations in the one or more axial directions as outputted from the controller.

First, it is assumed that the controller employed in the first embodiment includes a uniaxial acceleration sensor for detecting an acceleration in one axial direction. The acceleration sensor provided in the controller generates an acceleration signal comprised of a first half wave signal and a second half wave signal once the controller is moved in one direction. The first half wave signal is an acceleration signal first generated when the controller is moved in the one direction, and the second half wave signal is an acceleration signal generated subsequent to the first half wave signal and having a reversed polarity. If the generated signal is an acceleration signal available for display control, the first half wave signal and the second half wave signal, each having an amplitude equal to or more than a predetermined value, are generated in succession within a given time period.

In one or more embodiments of the present invention, the game executing section may move the image object on the display screen based on an acceleration signal. At first, the game executing section may determine based on the first generated acceleration signal (the first half wave signal) whether or not the generated acceleration signal is appropriate for display control to move the image object. If the generated acceleration signal (the first half wave signal) is not appropriate and the image object is moved based on that inappropriate acceleration signal, the movement of the controller operated by the game player will not be consistent with the movement of the image object. In the first embodiment, however, inappropriate acceleration signals are not used for display control of the image object. Thus the game player will not feel strange about the movement of the image object.

Various criteria may be available to determine whether an acceleration signal is normal or inappropriate. An inappropriate acceleration signal does not have any feature of a signal waveform that may be obtained when the controller is normally moved. For example, if a peak of the acceleration signal is not detected within a given time period after the controller has been started to move or if the acceleration signal does not reach zero within a given time period, the detected acceleration signal is not normal.

The game executing section also determines a generated acceleration signal is inappropriate if the first half wave signal of the generated acceleration signal does not exceed a predetermined threshold indicating a non-operational range limit. With this determination, the image object is not moved even though a faint acceleration signal is generated while the game player holds the controller without moving it. The game player will be distracted even with a slight movement of the image object if the player does not intentionally move the controller. In the first embodiment, the image object is not moved when the game player does not intentionally move the controller since inappropriate acceleration signals are not used, thereby allowing the game player to concentrate on the game play.

In one or more embodiments of the present invention, the game executing section may execute display control to move the image object based on the second half wave signal of the acceleration signal that is generated subsequent to the first half wave signal and has a reversed polarity.

The image object may be moved based on or following the second half wave signal until the second half wave signal reaches zero. In the first embodiment, however, the game executing section executes the display control such that the image object is moved toward the home position when the second half wave signal reaches a peak. In this configuration, the image object is moved toward the home position without following the acceleration signal once the second half wave signal has reached the peak. It is sufficient simply to determine whether or not the acceleration signal reaches zero after the second half wave signal has reached the peak, thereby reducing the workload imposed on signal processing in the display control. As a result, the workload imposed on the hardware required for the display control may be reduced, thereby enabling appropriate image display control even in a slow processing unit. The game player seldom feels strange about the movement of the image object if the image object is moved back to the home position when the second half wave signal reaches the peak since the movement of the image object may be anticipated by the game player.

According to the first invention, the display control may be executed based on an acceleration signal appropriate for display control of the image object. The image objects may be displayed so that the game player may not feel strange about the movement of the image object while reducing the workload imposed on the hardware required for the display control.

In order to further reduce the workload imposed on the display control of the image object, a moving direction of the controller may be determined based on the first half wave signal. The term "direction" used herein indicates in which direction the controller is moved from its original position. The direction may be judged depending on two patterns, namely, which polarity, positive or negative, the first half wave signal has. Namely, the moving direction of the controller may be determined in advance by detecting the polarity of the generated first half wave signal in advance. In this manner, when the display control of the image object is executed based on the second half wave signal, the moving direction of the controller has already been judged, and the moving direction of the image object has accordingly been determined. Thus, it is sufficient to perform simple signal processing to move the image object according to how much the amplitude of the second half wave signal has changed, thereby reducing the workload imposed on the display control.

In one or more embodiments of the present invention, the game executing section may execute the display control to move the image object based on the second half wave signal of the acceleration signal. Various ways are available for the display control based on the second half wave signal. For example, coordinates of the controller in its moving direction relative to the home position may be determined and then coordinates indicating the position of the image object on the display screen may be determined according to a change in coordinates. Alternatively, an acceleration of the moving image object or a distance by which the image object is moved may be determined according to how large an amplitude of the second half wave signal is. Then, the image object may be moved based on the moving direction and the determined acceleration or moving distance, without using the coordinates.

The magnitude of an action to move or swing the controller depends upon the game player. Thus, it may be preferred to measure in advance the magnitude or speed of the player's action to move the controller before starting the game and to correct an acceleration signal to be outputted from the acceleration sensor within a predetermined range. For this purpose, the game executing section may include an acceleration signal correcting section for executing such correction.

For example, the acceleration signal correcting section may be configured to have a function of correcting an acceleration signal so that a measured maximum amplitude value of the acceleration signal, which is outputted from the controller and measured in advance when the game player moves the controller on a trial basis before starting the game, may fall in a range from a lower limit amplitude value to an upper limit amplitude value if the measured maximum amplitude value of the acceleration signal does not fall in the range from the lower limit amplitude value to the upper limit amplitude value where all movements of the image object can visually be recognized on the display screen. How much and far the controller is moved depends upon the game player. Such acceleration signal correcting section may prevent individual difference from affecting the image object, thereby allowing the image object to be always displayed on the screen.

More specifically, the acceleration signal correcting section may include a correction coefficient determining section that determines a correction coefficient, and a correction operating section that outputs a corrected acceleration signal obtained by multiplying the acceleration signal by the correction coefficient determined by the correction coefficient determining section. The correction coefficient determining section may be configured to determine the correction coefficient so that the maximum amplitude value of the corrected acceleration signal may be lower than a predetermined upper limit amplitude value if the measured maximum amplitude value is higher than the predetermined upper limit amplitude value and that the maximum amplitude value of the corrected acceleration signal may be higher than a predetermined lower limit amplitude value if the measured maximum amplitude value is lower than the predetermined lower limit amplitude value. In this configuration, correction of acceleration signal is available with a simple computing process according to the magnitude of the player's action to move the controller. As a result, the image object may be moved within an appropriate range on the display screen.

In one or more embodiments of the present invention, the game apparatus is applicable to a controller that includes an acceleration sensor for detecting accelerations in a plurality of axial directions (typically biaxial or triaxial directions). In this case, the game apparatus may basically include a controller that includes an acceleration sensor for detecting accelerations in one or more axial directions and outputs a plurality of operation signals including a plurality of acceleration signals outputted from the acceleration sensor with respect to the plurality of axial directions. The game apparatus may further include an image display apparatus including a display screen and a game executing section. The game executing section may include at least functions of executing a game program by using the plurality of operation signals as input signals, displaying an image object on the display screen of the image display apparatus based on the result of execution, and controlling a movement of the image object relative to a home position predetermined on the display screen as a starting point of the movement of the image object according to an output from the acceleration sensor for detecting the one or more accelerations in the one or more axial directions as outputted from the controller.

As the controller is moved, the game executing section moves the image object on the display screen based on the acceleration signals with respect to the one or more axial directions. If the controller including the acceleration sensor for detecting accelerations in the one or more axial directions is used, the game executing section determines based on a first generated acceleration signal (the first half wave signal) whether or not the generated acceleration signal is appropriate for display control to move the image object. Since a plurality of acceleration signals are generated corresponding to the one or more axial directions, it is required to determine whether or not the respective acceleration signals generated in the one or more axial directions are normal. As with the uniaxial acceleration sensor, when the generated acceleration signal is not normal or inappropriate, the movement of the image object will not be consistent with the movement of the controller if the image object is moved based on the inappropriate acceleration signal. The game executing section may be configured not to execute the display control if any one of the acceleration signals generated with respect to the one or more axial directions is not normal. How to determine whether or not the generated acceleration signal is normal may be the same as with the uniaxial acceleration sensor, and the determination process as described above may be executed for each output from the acceleration sensor with respect to the one or more axial directions.

If it is determined based on the respective first half wave signals that the acceleration signals generated with respect to the one or more axial directions are all usable, the game executing section may execute the display control to move the image object based on the second half wave signal that is generated subsequent to the first half wave signal.

As with the uniaxial acceleration sensor, the image object may be moved based on the second half wave signal until the second half wave signal reaches zero. However, the game executing section of the present invention executes the display control such that the image object is moved toward the home position once the second half wave signal has reached a peak. In this manner, the image object is moved toward the home position without following the acceleration signal once the second half wave signal has reached the peak. It is sufficient simply to determine whether or not the acceleration signal reaches zero after the second half wave signal has reached the peak, thereby reducing the workload imposed on signal processing in the display control. The game player seldom feels strange about the movement of the image object even if the image object returns to the home position when the second half wave signal reaches the peak.

It is arbitrary to determine how the game executing section moves the image object based on the second half wave signal. For example, a biaxial acceleration sensor may be configured to determine coordinates of the controller in two axial directions based on two outputs from the acceleration sensor or coordinates representing a position of the controller relative to its original position. Then, the coordinates are converted into coordinates on the display screen that represent a position of the image object on the display screen. The game executing section moves the image object by using the coordinates thus determined on the display screen. Further, a biaxial or triaxial acceleration sensor may be configured to synthesize a plurality of outputs generated from the acceleration sensor to generate a synthetic acceleration signal and move the image object on the display screen based on the thus obtained synthetic acceleration signal.

The present invention may also be identified as a computer-readable recording medium recorded with a computer program for a game apparatus. In one or more embodiments of the present invention where the game apparatus comprises a controller that includes an acceleration sensor for detecting one or more accelerations in one or more axial directions and outputs a plurality of operation signals including one or more acceleration signals outputted from the acceleration sensor with respect to the one or more axial directions, a computer-readable recording medium recorded with a computer program for a game apparatus may cause a computer to execute a plurality of functions necessary to control the movement of an image object displayed on a display screen of an image display apparatus relative to a home position predetermined on the display screen as a starting point of the movement of the image object according to an output from the controller. The necessary functions are a function of determining whether or not the acceleration signal is a normal signal available for display control to move the image object based on a first half wave signal of the acceleration signal occurring or generated when the controller is moved, a function of executing the display control to move the image object based on a second half wave signal of the acceleration signal occurring or generated subsequent to the first half wave signal if it is determined that the acceleration signal is normal, and a function of executing the display control to move the image object toward the home position when the second half wave signal reaches a peak.

In one or more embodiments of the present invention where a game apparatus comprises a controller that includes an acceleration sensor for detecting one or more accelerations in one or more axial directions and outputs a plurality of operation signals including one or more acceleration signals outputted from the acceleration sensor with respect to the one or more axial directions, a method of controlling an image object may be configured to use a computer to control the movement of an image object displayed on a display screen of an image display apparatus relative to a home position predetermined on the display screen as a starting point of the movement of the image object according to an output from the controller. Then, the computer is caused to determine whether or not the acceleration signal is a normal signal available for display control to move the image object based on a first half wave signal of the acceleration signal occurring when the controller is moved. If it is determined that the acceleration signal is normal, the computer is caused to execute the display control to move the image object based on a second half wave signal of the acceleration signal occurring subsequent to the first half wave signal. Once the second half wave signal has reached a peak, the computer is then caused to execute the display control to move the image object toward the home position.

BRIEF DESCRIPTION OF DRAWINGS

FIG. 6A shows a y-axial acceleration signal generated when the game player moves downward which has stayed stationary.

FIG. 6B shows a y-axial acceleration signal generated when the game player moves upward the controller which has stayed stationary.

FIG. 6C shows a y-axial acceleration signal generated when the game player moves the controller, which has stayed stationary, upward and then downward.

FIGS. 9A-9C each show how an image object and a timing mark displayed on the display screen move according to the first embodiment.

FIG. 9A shows the timing mark appears at the upper part of the display screen and falls downward while the image object stays at the home position.

FIG. 9B shows the image object starts moving when the game player moves the controller downward.

FIG. 9C shows the image object stops at the home position.

DESCRIPTION OF EMBODIMENTS

Figure 1:
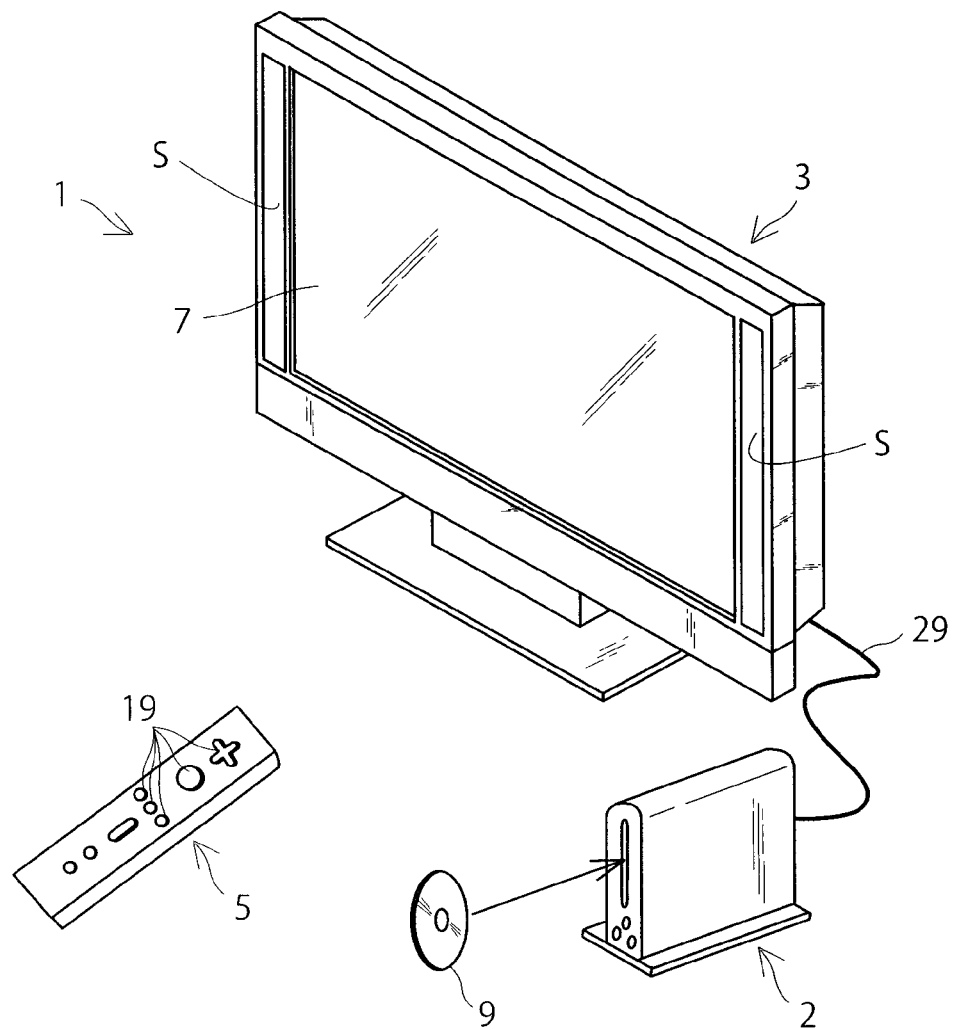
FIG. 1 illustrates an example external appearance of a game apparatus according to a first embodiment of the present invention.
Figure 2:
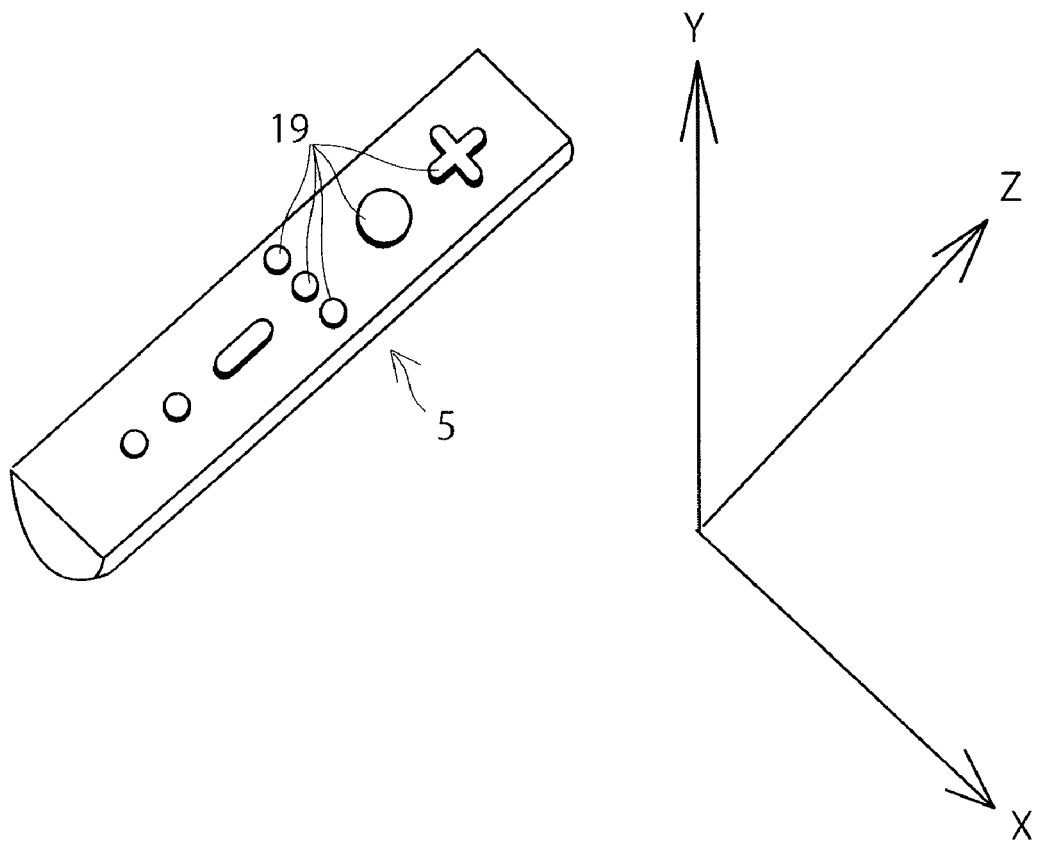
FIG. 2 illustrates an example external appearance of a controller used in the game apparatus of the first embodiment.
Figure 3:
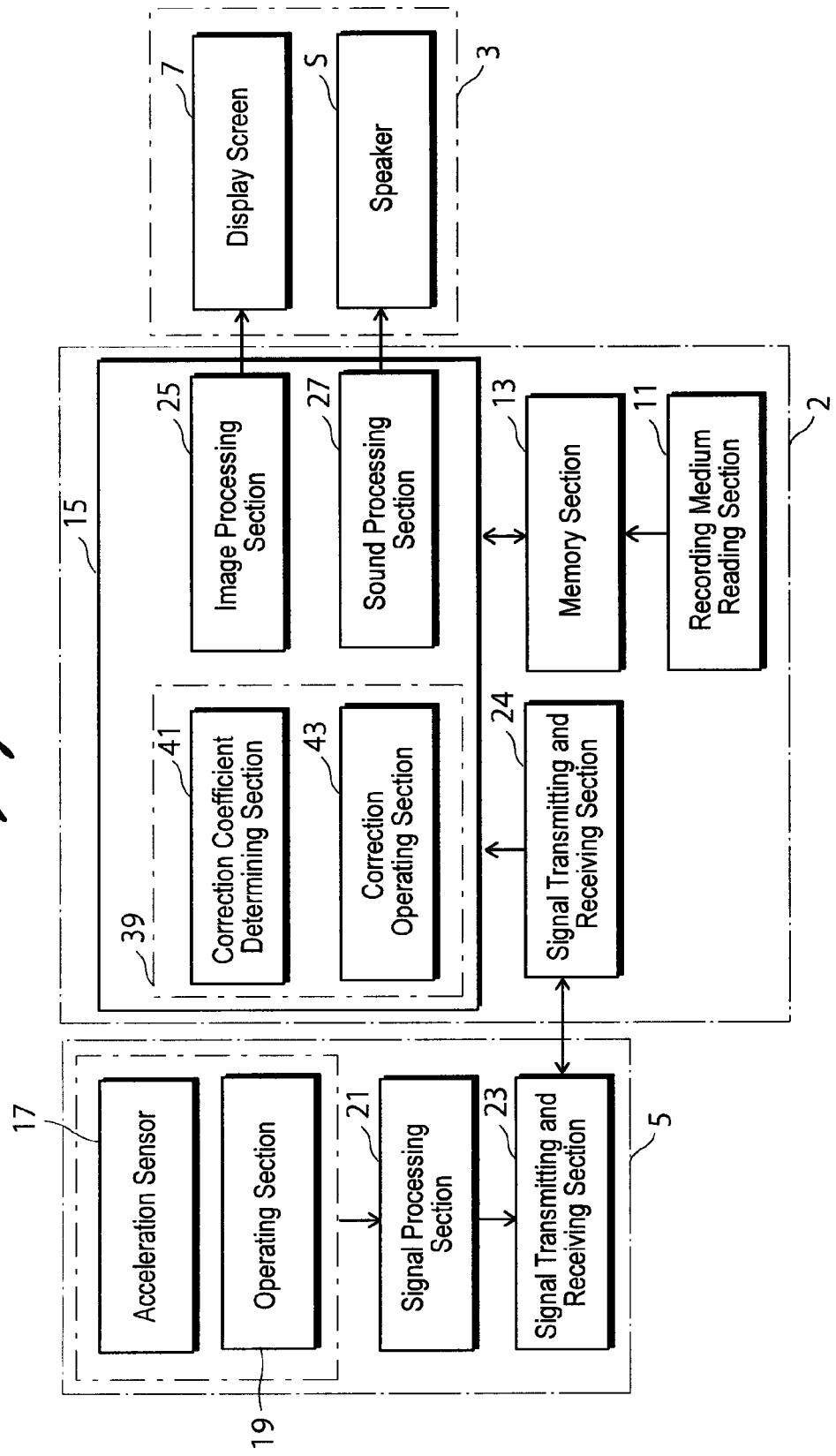
FIG. 3 illustrates a configuration of a control system for the game apparatus of the first embodiment.
Figure 4:
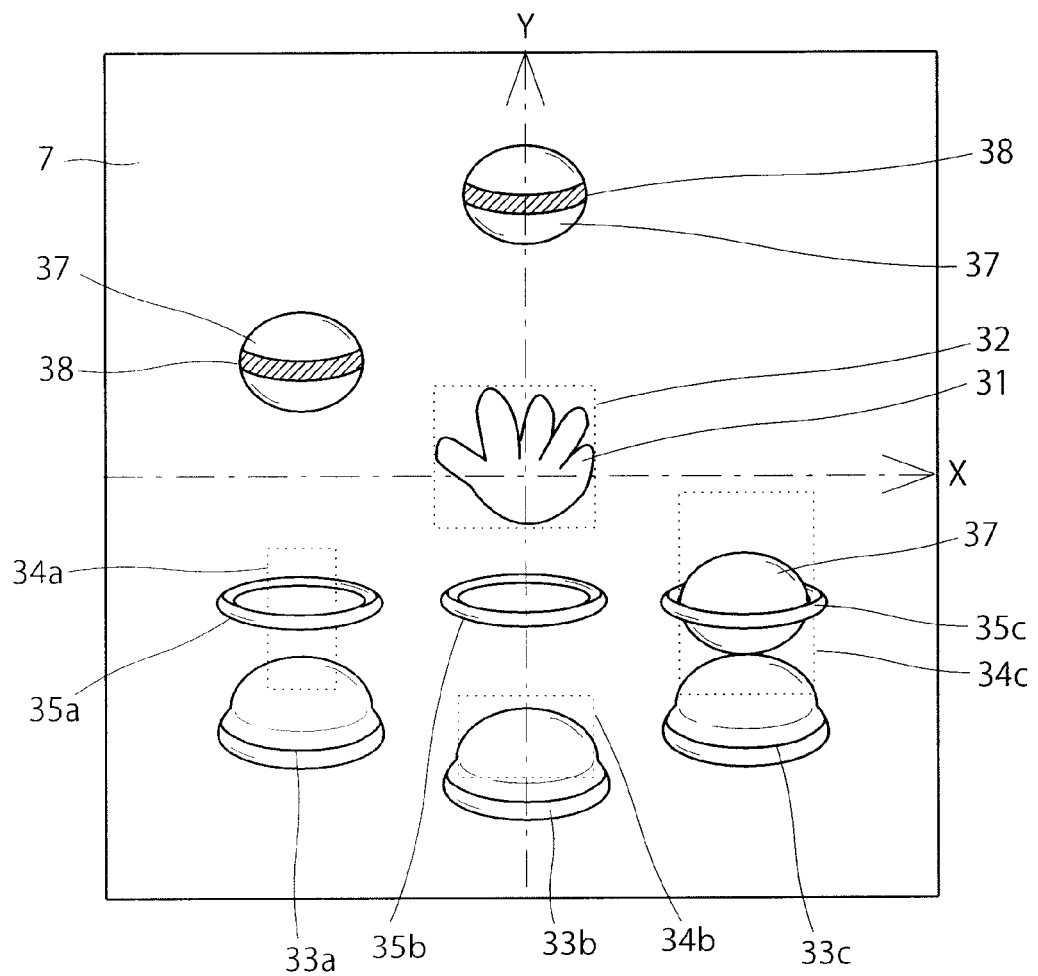
FIG. 4 illustrates an example display image displayed in the course of the game play on a display screen of the game apparatus of the first embodiment.
Figure 5:
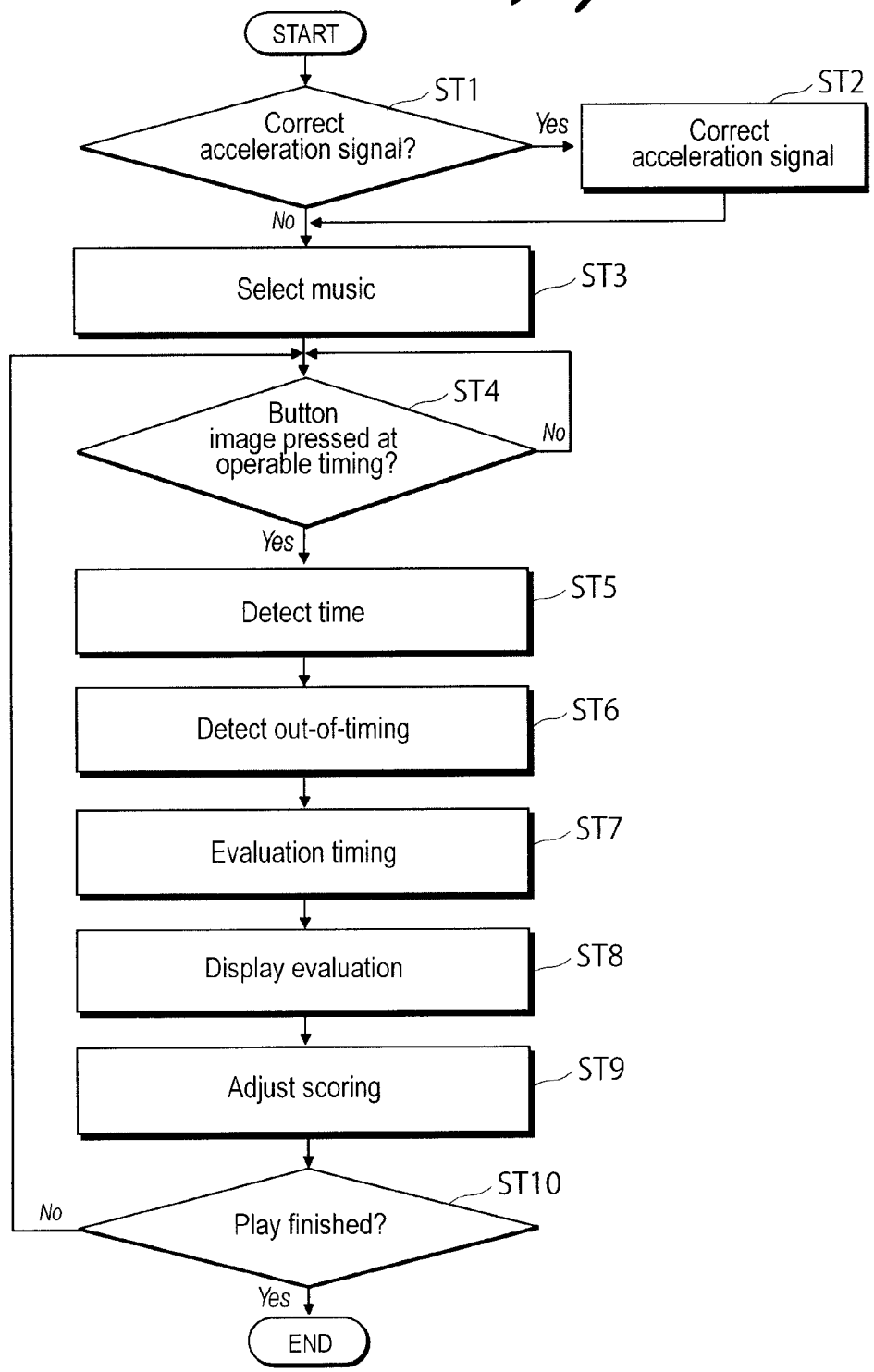
FIG. 5 is a flowchart showing an example flow of the game play according to the first embodiment.

Embodiments of the present invention will now be described in detail hereinbelow with reference to the accompanying drawings. FIG. 1 illustrates an example external appearance of a game apparatus 1 according to a first embodiment of the present invention, and the game apparatus 1 includes a game apparatus body 2, an image display apparatus 3 connected to the game apparatus body 2 and a controller 5 operated by a game player. FIG. 2 illustrates an external appearance of the controller 5. FIG. 3 shows a configuration of a display control system for the game apparatus of the first embodiment. FIG. 4 illustrates an example display image displayed during the game play on a display screen 7 of the image display apparatus 3. FIG. 5 is a flowchart showing a general flow of the game play according to the first embodiment.

The embodiment of FIGS. 1 through 3 is applied to a game apparatus for home use. The game apparatus body 2 has a built-in microcomputer, and enables a game to be played based on a game program recorded in a recording medium 9. The program is read by a recording medium reading section 11, stored in a memory section 13, and executed by a game executing section 15.

FIG. 2 is a perspective view of the controller 5 as viewed from above behind. The controller 5 includes an acceleration sensor 17 capable of detecting accelerations in three axial directions of x-axis, y-axis, and z-axis that are orthogonal to one another as illustrated, and a plurality of operating sections 19. Signals are transmitted and received wirelessly between the controller 5 and the game apparatus body 2 to allow the game player to easily grip and swing the controller. A longitudinal direction of the controller 5 is defined as the z-axial direction and a direction toward the front side of the controller 5 is the positive z-axial direction. The thickness direction or upside-to-downside direction of the controller 5 is defined as the y-axial direction and a direction toward the surface where the operating sections 19 are disposed is defined as the positive y-axial direction. The left/right direction of the controller 5 is defined as the x-axial direction and a direction from left to right of the controller 5 as viewed in FIG. 2 is the positive x-axial direction. As shown in FIG. 3, signals from the acceleration sensor 17 and the operating sections 19 are processed in a signal processing section 21 and transmitted via a signal transmitting/receiving section 23 to a signal transmitting/receiving section 24 of the game apparatus body 2. Signals are transmitted and received between the signal transmitting/receiving sections 23 and 24.

The game executing section 15 includes an image processing section 25 and a sound processing section 27, and executes the game based on the game program stored in the memory section 13 and signals outputted from the controller 5, and outputs a signal to the image display apparatus 3. The game apparatus body 2 and the image display apparatus 3 are connected with a cable 29, and an image is displayed on the display screen 7 based on an image display signal transmitted from the image processing section 25. Sounds including music and sound effects are outputted from a speaker S based on a sound signal transmitted from the sound processing section 27.

FIG. 4 illustrates a basic display image displayed during the game play on the display screen 7 according to the first embodiment. The coordinate axes and a hit zone are illustrated just for explanatory purposes and are not actually displayed on the display screen 7. A hand-like image object 31 is displayed on the display screen 7 and is moved according to the movement of the controller 5 operated by a game player. Button images or target image objects 33a, 33b and 33c (hereinafter may be collectively referred to as "button images 33") are also displayed on the display screen and are virtually pressed with the image object 31 operated by the game player. Ring-shaped timing determining images 35a, 35b and 35c (hereinafter may be collectively referred to as "timing determining images 35") are also displayed on the display screen and correspond to the button images 33a, 33b and 33c. A ball-like timing mark 37 is also displayed on the display screen and indicates an operational timing. An image-object-side hit zone (a zone for hit determination) 32, which moves according to the movement of the image object 31, is defined for the image object 31. Button-image-side hit zones (zones to be hit) 34a, 34b and 34c (hereinafter may be collectively referred to as "button-side hit zones 34") are defined for the button images 33a, 33b, and 33c. Sizes, shapes, positions and other aspects of the image-object-side hit zone 32 and the button-image-side hit zones 34 may arbitrarily be determined and the button-image-side hit zones 34 may simply be configured to surround the button images 33. In this configuration, however, the button-image-side hit zones 34 are concentratedly disposed so close to one another that the game player may press a wrong button image 33 or fail to press an aimed button image 33. Accordingly, in the first embodiment, assuming that the game player holds the controller 5 in his/her right hand and faces the image display apparatus 3 when he/she plays the game, the button-side hit zones 34 are arranged, taking into consideration how smooth the player's arm can move in view of human bone structure, whereby the arm can more readily move inward and less readily move outward. Specifically, the button-side hit zone 34a may be sized smaller, the button-side hit zone 34b may be disposed at a lower portion of the screen, and the button-side hit zone 34c may be sized larger and vertically longer. The arrangement of the three hit zones 34 is curved to be convex in a direction away from the home position of the image object 31 so that the game player may exactly press the aimed button image 33. The timing determining images 35 are aligned in a line. If the player prefers to hold the controller 5 in his/her left hand rather than right hand, the left arm may be set as the dominant arm of the player before starting the game and the arrangement of the button-image-side hit zones may accordingly be changed. In the first embodiment, the x-y coordinate system is defined on the screen such that a right hand of the screen is the positive x-axis direction and a left hand is the negative x-axis direction while an upward direction of the screen is the positive y-axis direction and a downward direction is the negative y-axis direction, with a point at which the image object 31 is stopped being defined as the original of the coordinate system. The x-axis and y-axis thus defined correspond to the x-axial and y-axial directions of the acceleration signals of the controller 5. According to the first embodiment, Z-axial coordinates are not defined since the image object 31 is not moved in the depth direction.

Next, the game flow of the first embodiment will be described with reference to FIGS. 4 and 5. The game to be played in the embodiment is a music game in which the game player is supposed to virtually press the virtual button images 33a, 33b and 33c with the image object 31 by moving the controller 5 in an appropriate direction according to a given rhythm of the music outputted from the speaker S and motions of the timing mark 37, and the timing at which the player has pressed the button is evaluated.

First, before starting the game, it is determined as needed in step ST1 whether or not the acceleration signal should be corrected according to the magnitude of the player's action to move the controller when the game player moves or swings the controller. If it is determined that the acceleration signal should be corrected, the process proceeds to step ST2, and afterwards proceeds to step ST3. If there is no need of correcting the acceleration signal in some cases such as the correction has already been executed, the process may skip directly to step ST3. Details on correcting the acceleration signal will be described later.

The game player selects music to be played in the game in step ST3 and starts the game. When the game starts, the timing marks 37 start falling down toward the respective timing determining images 35 from top to bottom of the display screen in time to the music selected by the game player. The game player operates the controller 5 to move the image object 31 according to an operational timing so that the image object 31 may hit the button image 33 at the operational timing. Here, the operational timing is defined as a period from the time that the timing mark 37 starts passing through the ring-shaped timing determining image 35 till the time that it has completely passed out of the timing determining image 35. Whether or not the button image 33 has been pressed is determined by performing coordinate computations and judging whether or not the respective button-side hit zones 34 and the image-object-side hit zone 32 that moves according to the image object 31 are partially overlapped. Evaluation may be differentiated according to how much they are overlapped.

According to the first embodiment, the game executing section 15 shown in FIG. 3 determines in step ST4 whether or not the button image 33 is pressed at the operational timing or whether or not the image-object-side hit zone 32 and each button-side hit zone 34 are partially overlapped. If partial overlapping is determined, the time that the zones are partially overlapped is detected in step ST5 and a shift or difference from the optimal timing is detected in step ST6. The optimal timing is defined as the moment that a strap mark 38 provided in the spherical timing mark 37 is overlapped with the timing determining image 35. The action timing is evaluated by three grades such as "Great", "Good" and "Bad" based on the shift or difference from the optimal timing in step ST7. Evaluation results are indicated in letters on the timing determining image 35 like "Great", "Good" or "Bad" and sounds indicative of the evaluation results are also outputted in step ST8. Scores are accumulated based on the evaluation results in step ST9. Steps from ST4 through ST9 are repeated until the game is finished in step ST10. Once the game is finished, the display screen 7 displays how many times the respective grade evaluations of "Great", "Good" and "Bad" are obtained together with the final scoring. In the first embodiment, three timing determining images 35a, 35b and 35c are provided as the timing determining images 35, and the steps from ST4 through ST9 are performed for each of the timing determining images 35a, 35b and 35c.

Next, how to control the movement of the image object 31 based on the acceleration signal will be described with reference to FIGS. 6 to 8.

Figure 6A:
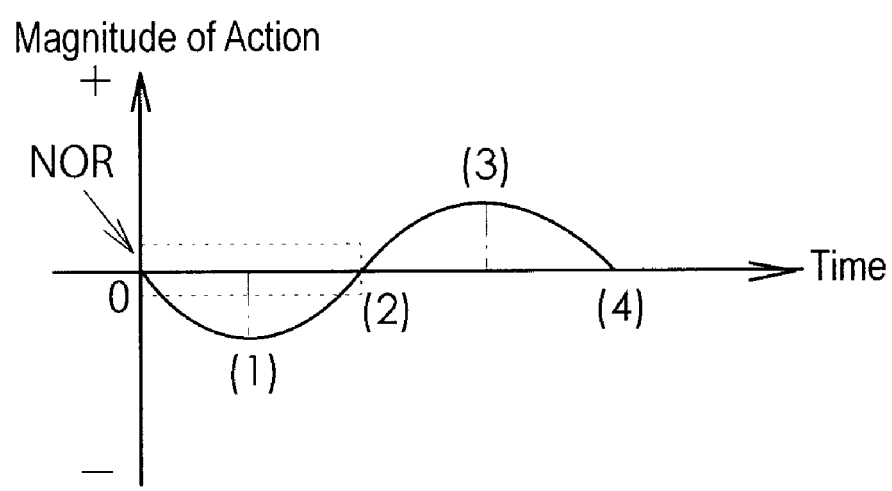
FIGS. 6A-6C each show an example acceleration signal outputted from an acceleration sensor used in the first embodiment.
Figure 6B:
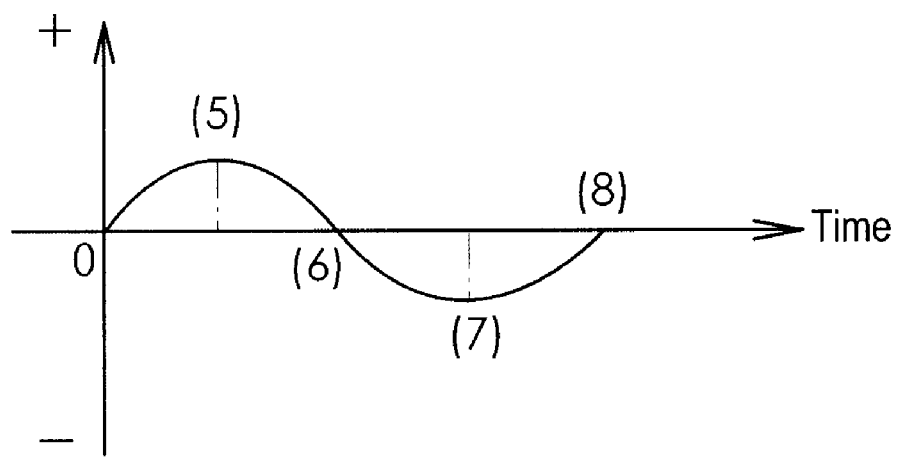
Figure 6C:
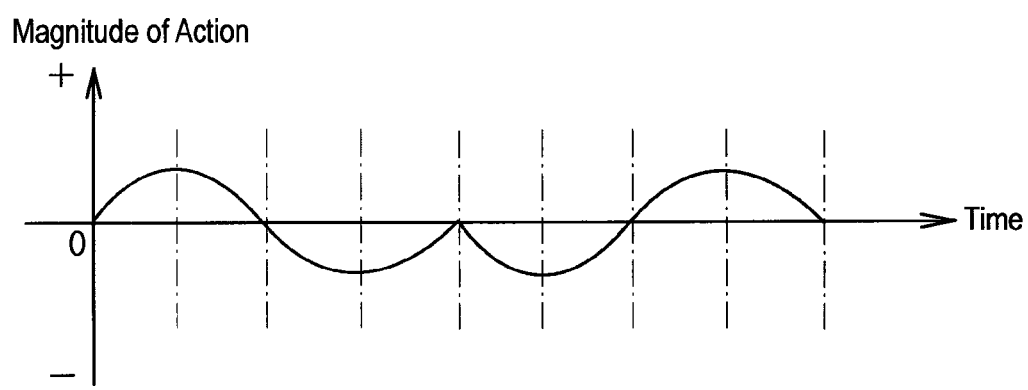

FIGS. 6A to 6C illustrate example waveforms of the acceleration signals generated from the acceleration sensor 17 by moving the controller 5 of the first embodiment. The acceleration signals are outputted with respect to the x-axial direction, y-axial direction and z-axial direction as voltage signals of −3.2V to +3.2V. As already mentioned, only outputs in the x-axial direction and y-axial direction are used in the first embodiment in order to cause the image object 31 to move on a plane. In the following paragraphs, an acceleration signal outputted in the y-axial direction is taken as an example for purposes of explanation.

For example, FIG. 6A shows a y-axis acceleration signal generated when the game player moves down the controller 5 which has stayed stationary. As shown in the figure, when the controller 5 begins to move, a negative polarity acceleration signal is generated, having a peak at (1). The movement of the controller 5 is accelerated for a period from (0) to (2), and the downward velocity reaches a peak at (2). When the controller 5 begins to decrease its moving velocity, a positive polarity acceleration signal is generated, having a peak at (3). The movement of the controller 5 is decelerated for a period from (2) to (4), and the controller 5 stops at (4). The waveform from (0) to (2) represents a first half wave signal and the waveform from (2) to (4) represents a second half wave signal.

As the controller 5 is moved upward, an acceleration signal having a polarity opposite to that of the downward movement of the controller 5 is generated in the y-axial direction as shown by the waveform of FIG. 6B. The controller 5 is accelerated for a period from (0) to (6), and reaches the maximum upward velocity at (6). The controller 5 is decelerated for a period from (6) to (8), and stops at (8). The waveform from (0) to (6) represents a first half wave signal and the waveform from (6) to (8) represents a second half wave signal.

Accordingly, for example, if the controller 5 is moved upward and then downward, an acceleration signal of a combination of the two waveforms is outputted in the y-axial direction, as shown in FIG. 6C.

According to the first embodiment, the game executing section 15 executes display control of the image object 31 based on such acceleration signals as shown in FIGS. 6A to 6C. However, if the acceleration signals are used as they are, the image object 31 will move in an unnatural manner, namely, the image object 31 will move based on the first half wave signal and then in a reversed direction based on the second half wave signal. To avoid this, in the first embodiment, the image object 31 is moved only based on the second half wave signal. However, it is not sufficient simply to ignore the first half wave signal and follow only the second half wave signal to control the display of the image object 31. There still remains a possibility that the image object 31 may be moved according to a faint acceleration signal that may be generated even when the player holds the controller 5 in hand and does not move it. Assuming that a non-operational range of the acceleration signal is defined to solve the problem, a delay in display control may occur and may accordingly delay the timing to start moving the image object 31, thereby making the player feel strange about the movement of the image object 31. Further, there is a possibility that the detected acceleration signal may be inappropriate or may not be normal for moving the image object 31. To solve these problems, it is determined by the game executing section 15 based on the first half wave signal whether or not the detected acceleration signal is normal and available to move the image object 31, following the steps shown in the flowchart of FIG. 7. In the first embodiment, the game executing section 15 determines a moving direction of the controller based on the first half wave signal, thereby reducing the workload imposed on the display control of the image object 31.

Figure 7:
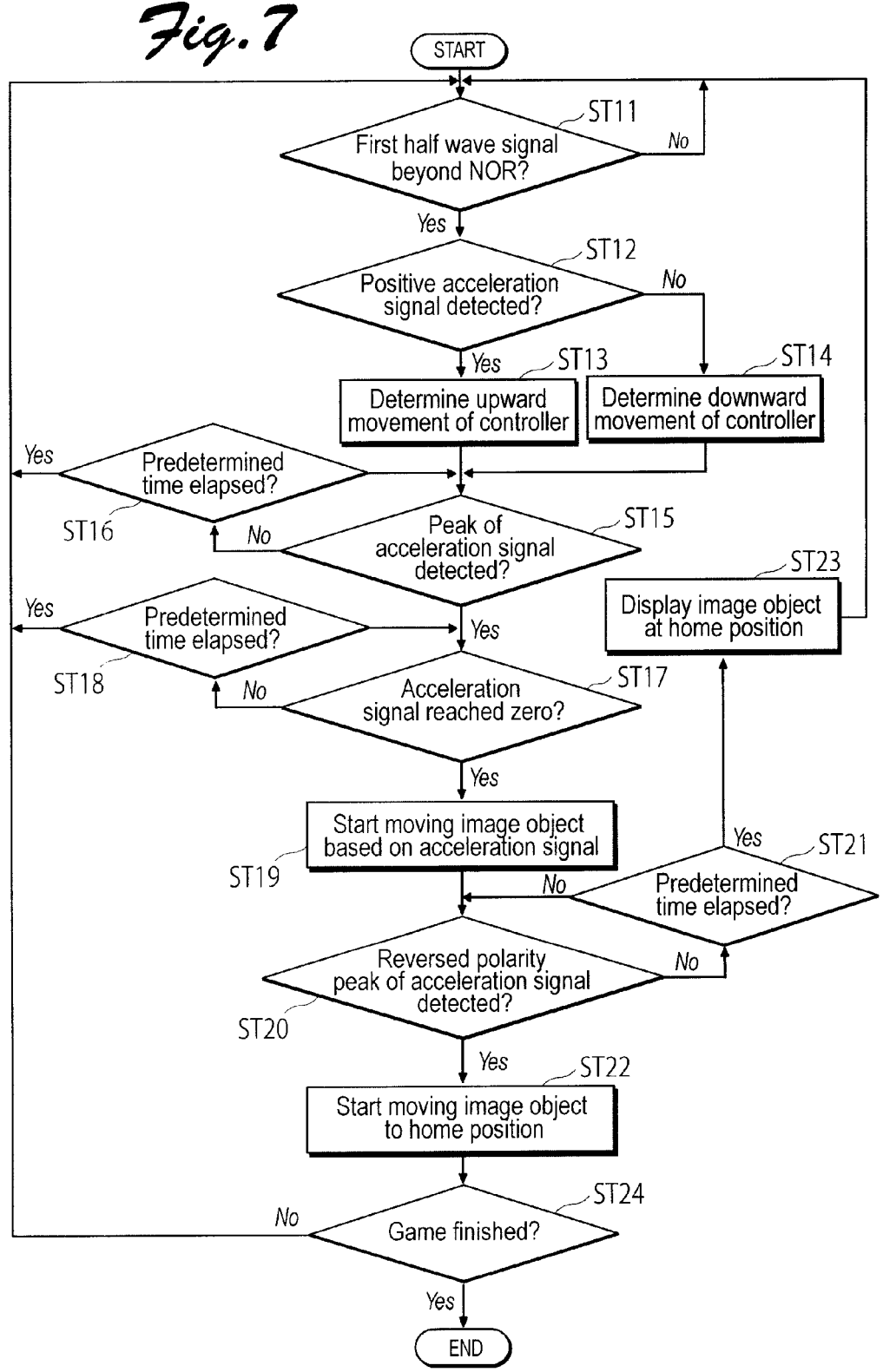
FIG. 7 is a flowchart showing a program algorithm used when display control of an image object is executed based on the acceleration signal according to the first embodiment.
Figure 8:
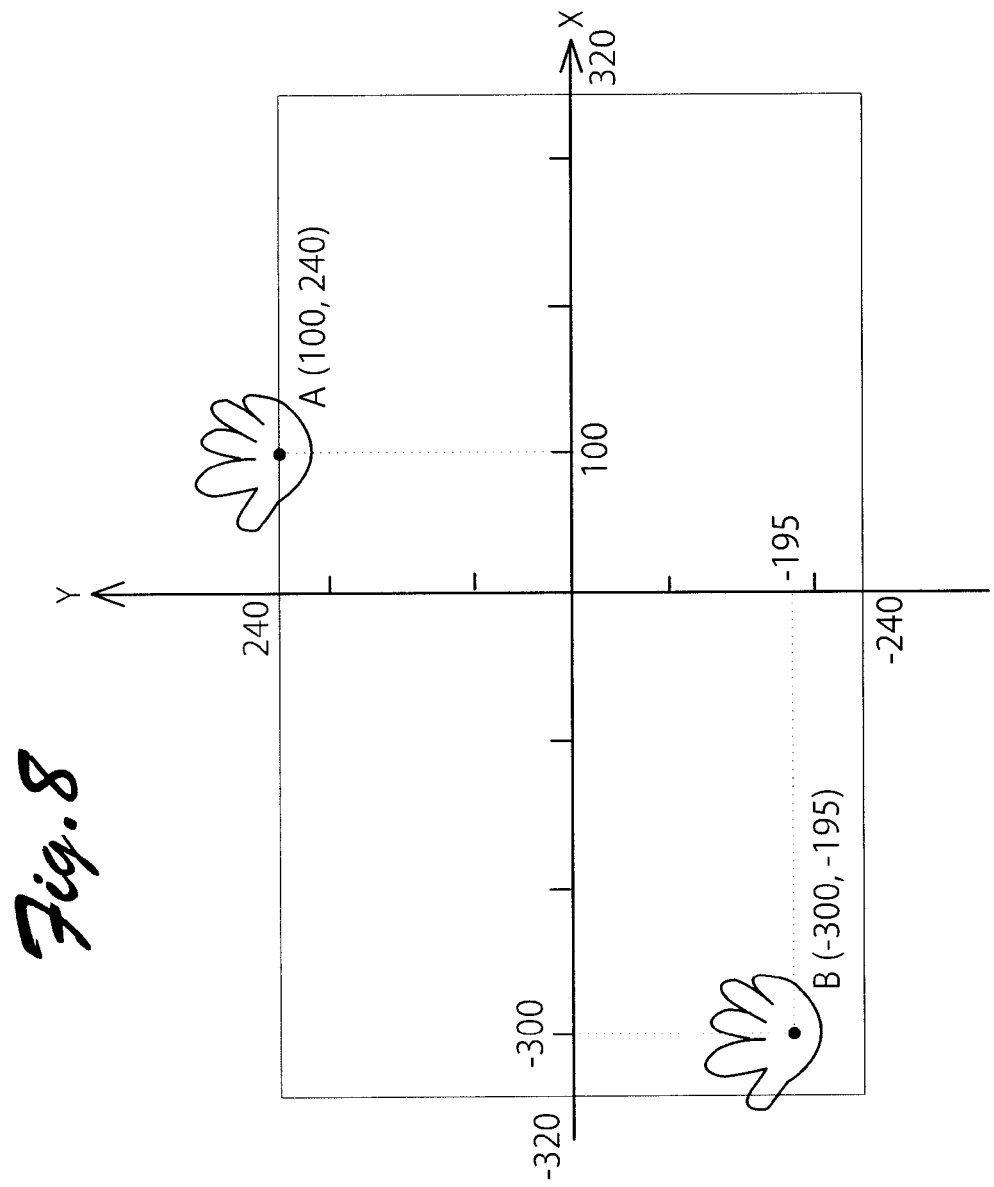
FIG. 8 shows an example display control for moving the image object according to the first embodiment.

FIG. 7 is a flowchart to exemplarily show how to determine the acceleration signal with respect to the y-axial direction. In the first embodiment, the game executing section 15 first defines a non-operational range for the first half wave signal of the acceleration signal. FIG. 6A illustrates an example non-operational range NOR. It is difficult for the game player to keep the controller 5 completely stationary when he/she holds it in hand. A faint acceleration signal may inevitably be outputted even though the player does not move the controller intentionally. Then, it is determined in step ST11 whether or not the first half wave signal of the acceleration signal gets out of the non-operational range.

If an acceleration signal, of which the first half wave signal gets out of the non-operational range, is detected in step ST11, the game executing section 15 determines the polarity of the acceleration signal in step ST12. If the detected acceleration signal is positive, the process proceeds to step ST13 where the game executing section 15 determines that the controller 5 has been moved upward. If it is determined that the acceleration signal is negative, the process proceeds to step ST14 where the game executing section 15 determines that the controller 5 has been moved downward. In this manner, if the game executing section 15 determines in advance the moving direction of the controller 5 with respect to each axis based on the first half wave signal that gets out of the non-operational range, the remaining signal processing for moving the image object may be facilitated. In this case, the image object may be moved simply by detecting an amplitude of the second half wave signal generated subsequent to the first half wave signal. Thus the workload imposed on the computer hardware may be reduced.

The game executing section 15 determines in steps ST17 and ST18 whether or not the acceleration signal reaches zero within a predetermined period, in other words, (2) of FIG. 6A or (6) of FIG. 6B is detected, once the peak of the acceleration signal, namely, (1) of FIG. 6A or (5) of FIG. 6B has been detected within a predetermined period in steps ST15 and ST16. If the peak of the acceleration signal is not detected or does not reach zero within the predetermined periods after the controller 5 has started to move, the game executing section 15 determines that the detected acceleration signal is not normal or is inappropriate, and the process goes back to step ST11 and a standby state is entered until another acceleration signal that gets out of the non-operational range is detected in steps ST16 or ST18. If the acceleration signal has reached zero in step ST17, it means the first half wave signal of a normal acceleration signal is detected. The detected acceleration signal is very likely to be normal. Accordingly, if it is detected in step ST17 that the acceleration has reached zero, a display control process for moving the image object 31 is started based on the acceleration signal in step ST19. Here, the determination criteria as to whether or not an acceleration signal is usable for the display control of the image object are not limited to the above-mentioned steps from ST15 to ST17, and may suitably be defined according to the characteristics of the acceleration sensor used. The display control will be later described in detail.

Next, the game executing section 15 determines in steps ST 20 and ST 21 whether or not a peak of the acceleration signal having a polarity opposite to that of the first half wave signal, namely, (3) of FIG. 6A or (7) of FIG. 6B has been detected within a predetermined period. In the first embodiment, if the peak has been detected, the game executing section 15 executes the display control to move the image object 31 toward the home position in step ST22. The display control may be configured to further move the image object 31 based on the acceleration signal even after the peak has been detected. In the first embodiment, however, the game executing section 15 executes the display control so that the game player may not feel strange about the movement of the image object 31 while reducing the processing workload. If the peak has not been detected within the predetermined period, the game executing section 15 returns the image object 31 to the home position in step ST23. The steps shown in the flowchart of FIG. 7 will be repeated until the game is finished in step ST24.

FIG. 7 is an example flowchart for determining the acceleration signal in the y-axial direction. As to the x-axial detection, if the polarity of the acceleration signal detected in step ST12 is positive, it is determined in step ST 13 that the controller 5 has been moved rightward. If the polarity of the acceleration signal detected in step ST12 is negative, it is determined in step ST 14 that the controller 5 has been moved leftward.

Specifically, in the first embodiment, the display control to move the image object 31 is executed as follows. As already mentioned, the acceleration signal is outputted as a voltage from −3.2V to +3.2V in both the x-axis and the y-axis, and each axial coordinate for displaying the image object 31 is determined using the following expression:

(Coordinate)=[polarity (+ or −)]×(intensity of second half wave signal)×(movement coefficient)

Since the moving direction or the polarity of the acceleration signal with respect to each axial direction has already been determined based on the first half wave signal, only the intensity of acceleration signal is detected based on the second half wave signal. In the first embodiment, the moving coefficient is defined as 75 for the y-axis and 100 for the x-axis. Accordingly, the image object 31 can be moved in a range enclosed in a box defined with coordinates of (320, 240), (320, −240), (−320, −240), (−320, 240) as shown in FIG. 8. For example, if the first half wave signal in the x-axial direction and the y-axial direction has the positive polarity, and the second half wave signal in the x-axial direction is −1.0V and the second half wave signal in the y-axial direction is −3.2V, the image object 31 is displayed at position A of coordinates (100, 240). If the first half wave signal in the x-axial direction and the y-axial direction has the negative polarity, and the second half wave signal in the x-axial direction is +3.0V and the second half wave signal in the y-axial direction is +2.6V, the image object 31 is displayed at position B of coordinates (−300, −195). The above-mentioned image-object-side hit zone 32 is defined as a range enclosed in a box defined with respect to the coordinates of the image object 31. If it is determined by computing coordinates that the image-object-side hit zone 32 is partially overlapped with the button-side hit zone 34, it is determined that the button has been pressed. Known coordinates computing methods are available for hit determination and the description thereof will be omitted here.

How to compute the coordinates for determining a display position of the image object 31 is not limited to the above-mentioned method, and another expression such as [(−1)×(second half wave signal)×(movement coefficient)] may be used. In this method, the polarity of the second half wave signal needs to be detected in advance. In this expression, (−1) is multiplied because the second half wave signal of an outputted acceleration signal has a polarity opposite to the actual moving direction of the controller 5 in the first embodiment.

FIGS. 9A to 9C show how the image object 31 and the timing mark 37 move. In FIG. 9A, the timing mark 37 appears above the timing determining image 35b and is falling downward on the display screen while the image object 31 stays in the home position. If the game player moves down the controller 5 at the time that the timing mark 37 passes through the timing determining image 35b, the acceleration sensor outputs an acceleration having a waveform shown in FIG. 6A with respect to the y-axial direction. Accordingly, signal processing follows the steps as shown in the flowchart of FIG. 7. The image object 31 starts moving in step ST19 as shown in FIG. 9B. At the timing that the timing mark 37 passes through the ring-shaped timing determining image 35b, step ST4 of FIG. 5 is performed to determine whether or not the image-object-side hit zone 32 is overlapped with the button-side hit zone 34b. The image object 31 moves toward the home position once the second half wave signal of the acceleration signal reaches the peak at (3) of FIG. 6A, and finally stops at the home position as shown in FIG. 9C.

As described above, since the game executing section 15 moves the image object 31 based on an acceleration signal generated by moving the controller 5, the image object 31 may be operated in harmony with the movement of the controller 5 without performing any complicated steps so that the player may not feel strange about the movement of the image object 31. The display control may be executed based on a normal acceleration signal.

According to the first embodiment, as shown in steps ST1 and ST2 of FIG. 5, the acceleration signal is corrected as needed according to the magnitude of the player's action to move the controller before starting the game. The correction of the acceleration signal is performed by the correction coefficient determining section 41 and the correction operating section 43 of the acceleration signal correcting section 39 provided in the game executing section 15 as shown in FIG. 3.

Here, the movement of the image object 31 may suitably be adjusted by further multiplying the above-mentioned expression for coordinate determination by the correction coefficient.

Figure 10:
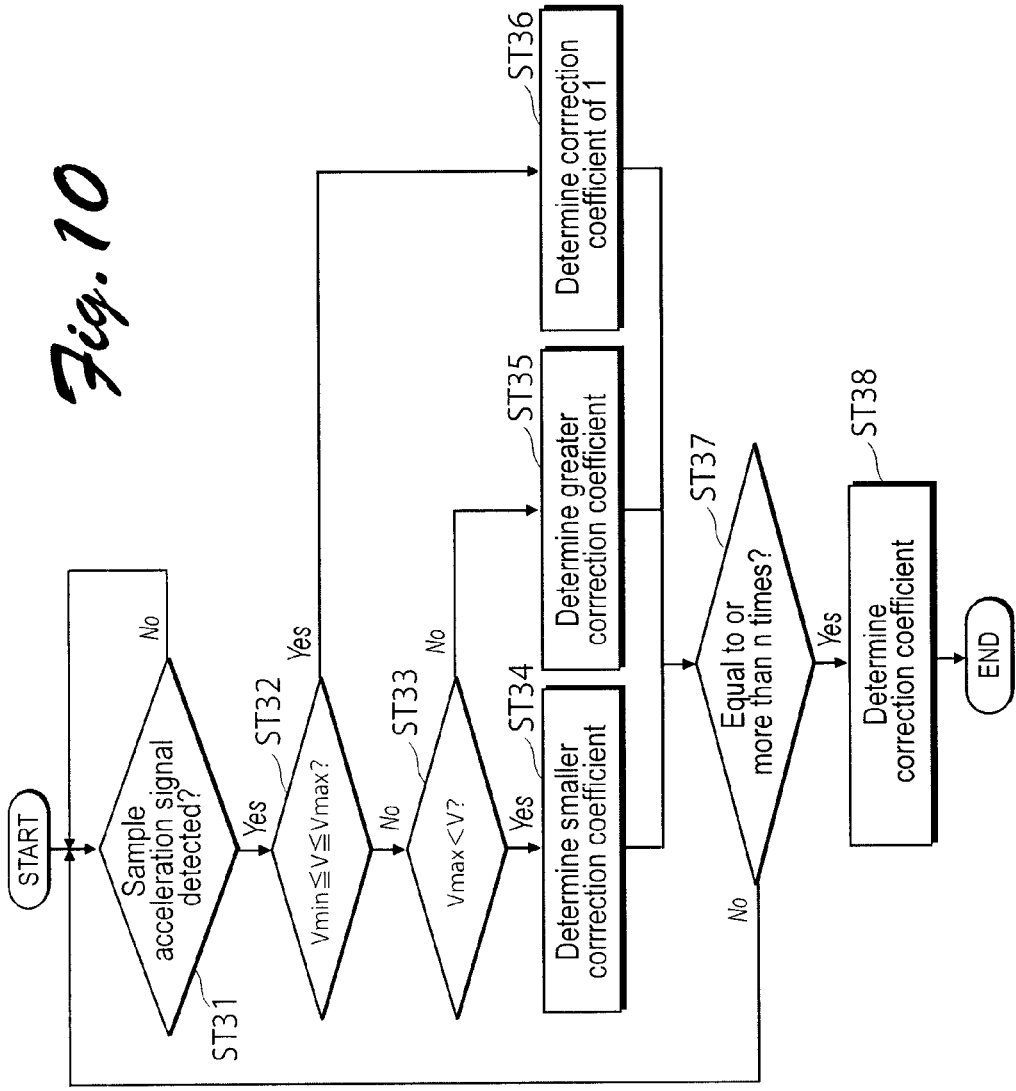
FIG. 10 shows an example flowchart for correction of an acceleration signal according to the first invention.

FIG. 10 is a flowchart for correcting acceleration signals, which will be performed in step ST2 of FIG. 5 subsequent to step ST1 where it is determined that the acceleration signal should be corrected. First, the game player is urged to move the controller 5 on a trial basis in step ST31 so that a sample acceleration signal may be detected. Then the correction coefficient determining section 41 determines whether or not a maximum amplitude value of the acceleration signal may fall in a predetermined range in step ST32. If it is determined that the detected maximum amplitude value of the acceleration signal is higher than the predetermined range in step ST33, a value smaller than 1, for example, 0.5 is determined as a correction coefficient in step ST34. If it is determined that the detected maximum amplitude value of the acceleration signal is lower than the predetermined range in step ST33, a value greater than 1, for example, 1.5 is determined as a correction coefficient in step ST35. If the maximum amplitude value of the acceleration signal falls in the predetermined range, a correction coefficient is determined as 1 in step ST36. The above steps are repeated by n times (n is an integer of one or more) in step ST37 to determine a final correction coefficient in step ST38, thereby finishing the correction process of acceleration signals. Once the correction of acceleration signal has been completed, coordinates may be obtained by further multiplying the expression for coordinate determination, with which the correction operating section 43 determines the display coordinates of the image object 31, by the correction coefficient.

In the first embodiment, the controller 5 includes a triaxial acceleration sensor. However, since no acceleration signal with respect to the z-axial direction is used here, a biaxial acceleration sensor may also be used. Of course, a uniaxial or single-axis acceleration sensor may be mounted in the controller to configure the simplest game apparatus. A typical music game apparatus provided with a uniaxial acceleration sensor may include a music game apparatus in which a Japanese drum is beaten with one drumstick.

Figure 11:
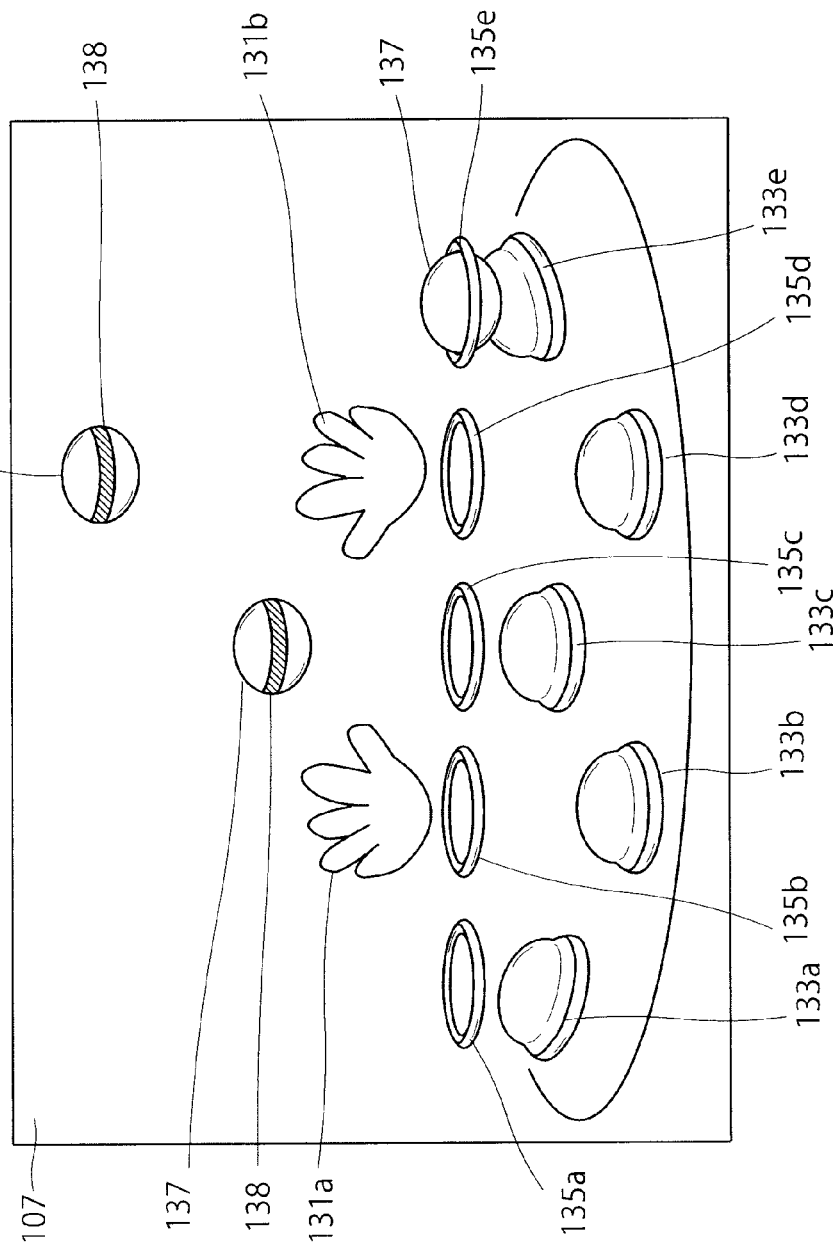
FIG. 11 illustrates an example display image displayed in the course of the game play on a display screen of a game apparatus according to a second embodiment of the present invention.

In the above embodiment, the game player handles one controller 5 in the game play, but another controller including an acceleration sensor may be prepared so that the game player may handle two controllers with both hands. In this case, the game executing section 15 executes the game program and simultaneously the display control of two image objects based on operation signals inputted from the two controllers. FIG. 11 illustrates a basic image configuration displayed on the screen during the game play according to a second embodiment of the present invention. In FIG. 11, parts similar to those of the first embodiment shown in FIGS. 1 through 10 have their reference numerals calculated by adding a number of 100 to the corresponding reference numerals shown in FIGS. 1 through 10, and descriptions will be omitted. As shown in FIG. 11, image objects 131a and 131b as well as button images 133a to 133e and timing determining images 135a to 135e corresponding thereto are displayed on a display screen 107. As a game player plays the game, facing an image display apparatus 103, the image object 131a on the player's left side is operated corresponding to a controller 105a held in the left hand of the game player while the image object 131b on the player's right side is operated corresponding to a controller 105b held in the right hand. According to the second embodiment, the display screen is longitudinally divided in half in the middle of the screen. The halved screens are used as movable ranges for the right and left image objects. In this manner, the button images 133a and 133b may be pressed only by the image object 131a and the button images 133d and 133e may be pressed only by the image object 131b. Only the button image 133c may be pressed by either of the image objects 131a and 131b.

Figure 12:
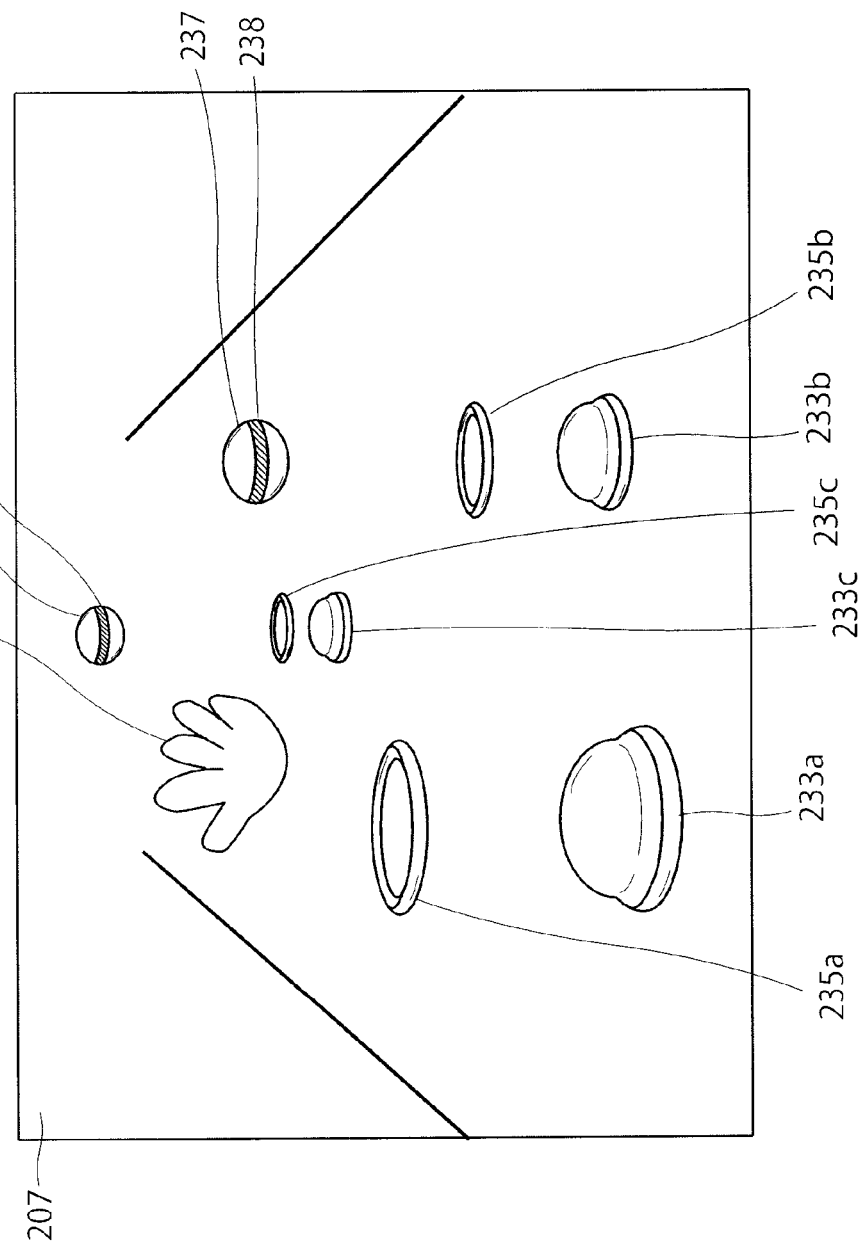
FIG. 12 illustrates an example display image displayed in the course of the game play on a display screen of a game apparatus according to a third embodiment of the present invention.

Although an acceleration signal with respect to the z-axial direction is not used in the above-mentioned embodiment, the acceleration signal with respect to the z-axial direction may also be used to move the image object in the depth direction as viewed from the front of the display screen. FIG. 12 shows a basic image configuration displayed on a screen during the game play according to a third embodiment of the present invention. In FIG. 12, parts similar to those of the embodiment shown in FIGS. 1 through 10 have their reference numerals calculated by adding a number of 200 to the corresponding reference numerals shown in FIGS. 1 through 10, and descriptions will be omitted. As shown in FIG. 12, a button image 233a is displayed in the nearest position relative to the game player, and a button image 233c is displayed in the farthest or the most distant position. The game player may press the button image 233a merely by moving down a controller 205. However, in order to press the button image 233c, it is necessary to move the controller 205 in a direction which allows a positive z-axial acceleration signal to be generated.

Figure 13:
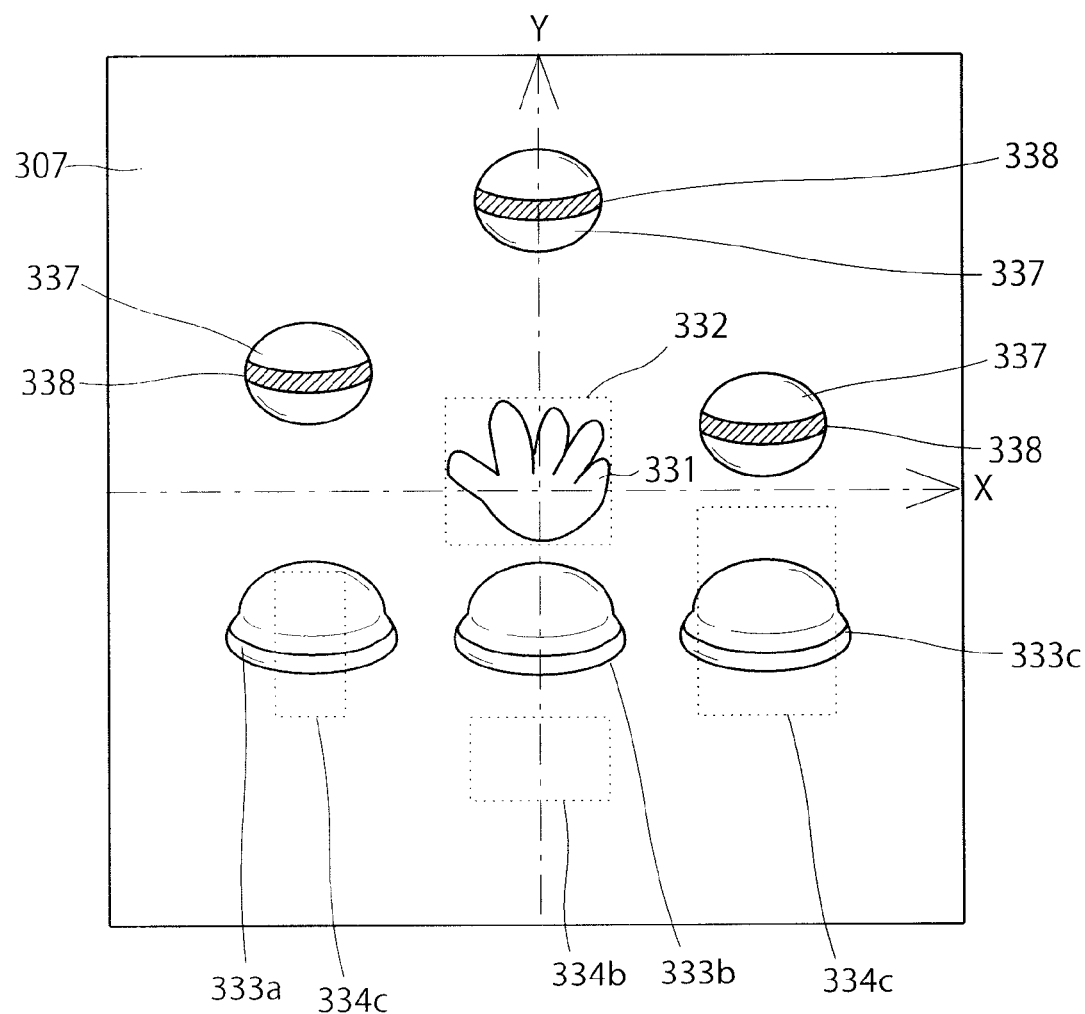
FIG. 13 illustrates an example display image displayed in the course of the game play on a display screen of a game apparatus according to a fourth embodiment of the present invention.

As described above, according to the first embodiment, the button-side hit zones 34 are disposed along a virtual line which is curved to be convex in a direction away from the home position of the image object 31, taking into consideration how smooth the player's arm can move in view of the human bone structure. The button images 33 are also disposed along the virtual curved line. This arrangement is good for experienced players because the arrangement is consistent with the motions of arms in view of the human bone structure. However, in this arrangement, the game player is required to focus on both the three button images 33 and the timing determining button images 35 that are disposed along the virtual curved line and vertically shifted or disposed apart from each other. This arrangement may impose an overload on beginner game players. To solve such a problem, another positional relationship of the button images and the button-side hit zones is suggested in FIG. 13. FIG. 13 shows a basic image configuration displayed on the screen during the game play according to a fourth embodiment of the present invention. Here, parts similar to those of the embodiment shown in FIGS. 1 through 10 have their reference numerals calculated by adding a number of 300 to the corresponding reference numerals shown in FIGS. 1 through 10, and descriptions will be omitted. As shown in FIG. 13, in the fourth embodiment, button images 333 also serve as the timing determining images and are arranged so that the button images are disposed along a horizontally-extending virtual straight line so that their middle portions may align on the virtual straight line. However, the positions and sizes of button-side hit zones 334 remain unchanged from those of the first embodiment. Namely, the button-side hit zones 334 are disposed along a virtual line curved to be convex in a direction away from the home position so that the foregoing virtual straight line may be a subtense therefor. As a result, the button-side hit zones 334 are shifted or disposed off the button images 33 in the vertical direction of the screen. According to the fourth embodiment, it is determined that an operational timing comes at the time that the timing mark 337 is overlapped with the button image 333. In this manner, the button images 333 serve as the timing determining images, thereby reducing the player's workload of visually confirming the operational timing. Since the button-side hit zones 334 are shifted or disposed off the button image 333 in the vertical direction of the screen as with the first embodiment even though the button images 333 are disposed along a straight line, the button-side hit zones 334 are positioned close to the locus of the controller, which is determined by the arm motion in view of the human bone structure. Thus the game player does not feel strange about the movement of the image object during the game play.

Hereinbelow, elements of the present invention, which are disclosed in the description and figures, are enumerated as follows.

(1) A game apparatus comprising:

a controller that includes an acceleration sensor for detecting one or more accelerations in one or more axial directions and outputs a plurality of operation signals including one or more acceleration signals outputted from the acceleration sensor, the one or more acceleration signals indicating one or more accelerations with respect to the one or more axial directions;

a game executing section that includes at least functions of executing a game program by using the plurality of operation signals as input signals, displaying a plurality of image objects on a display screen of an image display apparatus based on the result of execution, and controlling the movement of a particular image object among the plurality of image objects relative to a home position predetermined on the display screen as a starting point of the image object according to an output from the acceleration sensor as outputted from the controller; and a hit determining section included in the game executing section for determining whether or not the particular image object has got into a predetermined positional relationship with n target image objects included in the plurality of image objects where n is an integer of two or more, wherein the hit determining section sets a hit zone corresponding to the particular image object and capable of moving together with the particular image object relative to the particular image object, and sets n hit-target zones corresponding to the n target image objects, and determines that the positional relationship has been held if the hit zone is at least partially overlapped with the hit-target zone;

the game executing section executes a display control so that the n target image objects are disposed along a virtual straight line extending horizontally on the display screen so that their middle portions may align on the virtual straight line; and the hit determining section sets the n hit-target zones so that they are disposed along a virtual line curved to be convex in a direction away from the home position so that the foregoing virtual straight line may be a subtense therefor.

(2) The game apparatus according to (1), wherein the particular image object and the hit zone are at least partially overlapped with each other.

According to the present invention, the display control may be executed only based on normal acceleration signals usable for controlling the display of image objects. The display control of the image objects may be executed without performing complicated steps so that the game player may not feel strange about the movement of the image object.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A game apparatus comprising:
a controller that includes an acceleration sensor for detecting one or more accelerations in one or more axial directions and outputs a plurality of operation signals including one or more acceleration signals outputted from the acceleration sensor, the one or more acceleration signals indicating one or more accelerations with respect to the one or more axial directions; and
a game executing section that includes at least functions of executing a game program by using the plurality of operation signals as input signals, displaying an image object on a display screen of an image display apparatus based on the result of execution, and controlling a movement of the image object relative to a home position predetermined on the display screen as a starting point of the movement of the image object according to an output from the acceleration sensor for detecting the one or more accelerations in the one or more axial directions as outputted from the controller, wherein
the game executing section determines based on a first half wave signal of the acceleration signal whether or not the acceleration signal is appropriate for moving the image object, controls the display screen to move the image object away from the home position based only on a second half wave signal of the acceleration signal occurring subsequent to the first half wave signal if it is determined that the acceleration signal is appropriate for moving the image object, and controls the display screen to move the image object back toward the home position when the second half wave signal reaches a peak.

2. The game apparatus according to claim 1, wherein the game executing section further determines a direction in which the controller has been moved, based on the first half wave signal.

3. The game apparatus according to claim 1, wherein the game executing section moves the image object at an acceleration indicated by the amplitude of the second half wave signal.

4. The game apparatus according to claim 1, wherein the game executing section determines a distance by which the image object moves, based on the amplitude of the second half wave signal.

5. The game apparatus according to claim 1, wherein
the game executing section includes an acceleration signal correcting section; and
the acceleration signal correcting section corrects the acceleration signal in such a manner that a maximum amplitude value of the acceleration signal outputted from the controller is measured in advance when a game player moves the controller on a trial basis before starting the game and that the acceleration signal is corrected so that the measured maximum amplitude value of the acceleration signal may fall in a range from a lower limit amplitude value to an upper limit amplitude value if the measured maximum amplitude value of the acceleration signal does not fall in the range from the lower limit amplitude value to the upper limit amplitude value where all movements of the image object can visually be recognized on the display screen.

6. The game apparatus according to claim 5, wherein
the acceleration signal correcting section includes:
a correction coefficient determining section that determines a correction coefficient; and
a correction operating section that outputs a corrected acceleration signal obtained by multiplying the acceleration signal by the correction coefficient determined by the correction coefficient determining section; and
the correction coefficient determining section is configured to determine the correction coefficient so that a maximum amplitude value of the corrected acceleration signal may be lower than a predetermined upper limit amplitude value if the measured maximum amplitude value is higher than the predetermined upper limit amplitude value and that the maximum amplitude value of the corrected acceleration signal may be higher than a predetermined lower limit amplitude value if the measured maximum amplitude value is lower than the predetermined lower limit amplitude value.

7. The game apparatus according to claim 1, wherein the game executing section determines that the acceleration signal is appropriate for moving the image object, if the first half wave signal exceeds a predetermined threshold.

8. The game apparatus according to claim 1, wherein the game executing section determines that the acceleration signal is appropriate for moving the image object, if a peak of the first half wave signal is detected within a predetermined time period.

9. The game apparatus according to claim 1, wherein the game executing section determines that the acceleration signal is appropriate for moving the image object, if the first half wave signal becomes zero within a predetermined time period.

10. A computer program for a game apparatus stored on a non-transitory computer-readable medium, the game apparatus including a controller that includes an acceleration sensor for detecting one or more accelerations in one or more axial directions and outputs a plurality of operation signals including one or more acceleration signals outputted from the acceleration sensor with respect to the one or more axial directions, the computer program running on the game apparatus to control the movement of an image object displayed on a display screen of an image display apparatus relative to a home position predetermined on the display screen as a starting point of the movement of the image object according to an output from the controller, the computer program causing the game apparatus to execute the functions of:
determining whether or not the acceleration signal is appropriate for moving the image object, based on a first half wave signal of the acceleration signal occurring when the controller is moved;
controlling the display screen to move the image object away from the home position based only on a second half wave signal of the acceleration signal occurring subsequent to the first half wave signal if it is determined that the acceleration signal is appropriate; and
controlling the display screen to move the image object back toward the home position when the second half wave signal reaches a peak.

11. A method of controlling an image object, the method being implemented in a computer to control the movement of an image object displayed on a display screen of an image display apparatus relative to a home position predetermined on the display screen as a starting point of the movement of the image object according to an output from a controller that includes an acceleration sensor for detecting one or more accelerations in one or more axial directions and outputs a plurality of operation signals including one or more acceleration signals outputted from the acceleration sensor with respect to the one or more axial directions, the method comprising the steps of:

determining whether or not the acceleration signal is appropriate for moving the image object, based on a first half wave signal of the acceleration signal occurring when the controller is moved;

controlling the display screen to move the image object away from the home position based only on a second half wave signal of the acceleration signal occurring subsequent to the first half wave signal if it is determined that the acceleration signal is appropriate; and controlling the display screen to move the image object back toward the home position when the second half wave signal reaches a peak.

* * * * *